US012809621B1

(12) United States Patent
Lu et al.

(10) Patent No.: US 12,809,621 B1

(45) Date of Patent: Nov. 24, 2026

(54) TEMPLATE-DRIVEN SOURCE CODE DOCUMENTER TOOL

(71) Applicant: Zoom Communications, Inc., San Jose, CA (US)

(72) Inventors: Shun Lu, Anhui (CN); Qingquan Xie, Hefei (CN); Pan Zhang, Hangzhou (CH)

(73) Assignee: Zoom Communications, Inc., San Jose, CA (US)

( * ) Notice: Subject to any disclaimer, the term of this patent is extended or adjusted under 35 U.S.C. 154(b) by 245 days.

(21) Appl. No.: 18/633,042

(22) Filed: Apr. 11, 2024

(51) Int. Cl.

| | |
|---|---|
| ***G06F 9/44*** | (2018.01) |
| ***G06F 8/73*** | (2018.01) |
| ***G06F 9/445*** | (2018.01) |
| ***G06F 9/45*** | (2006.01) |
| ***G06F 9/455*** | (2018.01) |

(52) U.S. Cl.

CPC .................................... *G06F 8/73* (2013.01)

(58) Field of Classification Search

CPC ........................................................ G06F 8/73

See application file for complete search history.

(56) References Cited

U.S. PATENT DOCUMENTS

| | | | | |
|---|---|---|---|---|
| 7,539,982 | B2 * | 5/2009 | Stuart | G06F 16/80 707/999.102 |
| 11,733,999 | B2 | 8/2023 | Battaglia et al. | |
| 2015/0277899 | A1 * | 10/2015 | Hamby | G06F 11/3612 717/120 |
| 2023/0029250 | A1 * | 1/2023 | Abdelaziz | G06F 16/901 |
| 2023/0093304 | A1 | 3/2023 | Brasburg et al. | |
| 2023/0281318 | A1 * | 9/2023 | Clement | G06F 8/33 726/25 |
| 2023/0419036 | A1 * | 12/2023 | Wang | G06F 8/33 |
| 2024/0046214 | A1 * | 2/2024 | Shelline | G06F 8/71 |
| 2024/0346248 | A1 * | 10/2024 | Rappo | G06F 40/216 |
| 2024/0402999 | A1 * | 12/2024 | Chen | G06F 8/30 |
| 2025/0245001 | A1 * | 7/2025 | Das | G06F 8/75 |
| 2025/0251932 | A1 * | 8/2025 | Hensley | G06F 8/427 |

FOREIGN PATENT DOCUMENTS

| | | | | |
|---|---|---|---|---|
| CN | 110770698 A | * | 2/2020 | G06F 8/4443 |
| CN | 111399825 A | | 7/2020 | |
| CN | 112667274 A | | 4/2021 | |

(Continued)

OTHER PUBLICATIONS

Wen Siang Tan, Detecting Outdated Code Element References in Software Repository Documentation, 2022, pp. 1-25. https://arxiv.org/pdf/2212.01479 (Year: 2022).*

(Continued)

*Primary Examiner* — Mongbao Nguyen

(74) *Attorney, Agent, or Firm* — Young Basile Hanlon & MacFarlane, P.C.

(57) ABSTRACT

A request to generate a documentation of an interface is received. A function signature component of the interface is identified. The structure of the function signature component is recursively analyzed to obtain a recursive documented structure. The recursive documented structure is included, in the documentation of the interface. The request can be received, such as from a developer, by a plugin to an integrated development environment.

20 Claims, 14 Drawing Sheets

(56) References Cited

FOREIGN PATENT DOCUMENTS

| | | | | |
|---|---|---|---|---|
| CN | 115220697 A | | 10/2022 | |
| CN | 115407969 A | | 11/2022 | |
| CN | 117149155 A | * | 12/2023 | ............. G06F 8/315 |

OTHER PUBLICATIONS

Russell K. Standish, Fat API bindings of C++ objects into scripting language, Mar. 2024, pp. 1-5. https://arxiv.org/pdf/2403.14940 (Year: 2024).*

English translation, Brown et al. (CN 110770698 A), 2020, pp. 1-15. (Year: 2020).*

English translation, Chen et al. (CN 117149155 A), 2023, pp. 1-15. (Year: 2023).*

Swimm, Documentation generators: 6 great tools you should know, https://swimm.io/learn/documentation-tools/documentation-generators-great-tools-you-should-know, retrieved from internet Apr. 10, 2024, 8 pages.

YouTube, A Better Way To Do Developer Documentation, https://www.youtube.com/watch?v=z5u3Vr8mbDQ, James Q. Quick, May 11, 2023, 2 pages.

YouTube, OpenAPI 3.0 Tutorial| Swagger Tutorial For Beginners | Design REST API Using Swagger Editor, https://www.youtube.com/watch?v=mViFmjcDOoA, Tutorials Pedia, May 3, 2020, 3 pages.

YouTube, Doxygen Basics, https://www.youtube.com/watch?v=TtRn3HsOm1s, Abdullah, Jun. 30, 2019, 4 pages.

YouTube, NodeJS Swagger API Documentation Tutorial Using Swagger JSDoc, https://www.youtube.com/watch?v=S8kmHtQeflo&t=596s, Maksim Ivanov, Jan. 9, 2021, 2 pages.

* cited by examiner

630

632

```
public class RecordingLinkDTO {
        private String recordingCloudLink;
        private String previewLink;
        private String passCode;
        private List<String> recordingLocalLink;
        private in recordingCloudStatus;
        private List<RecordingLocalItemDTO> recordingLocalItemDTOs
        private String meetingId;
        private String clientIframeLink
}
```

634

```
public class RecordingLocalItemDTO {
  private String accountId;
  private String userId;
  private String meetingId;
  private String meetingNumberMeetingStartTime;
  private String computerId;
  private String computerName;
  private String location;
  private int meetingNumber;
  private String meetingTopic;
  private int meetingStartTime;
  private int meetingDuration;
  private int filesCount;
  private int filesSize;
  private String isDelete;
  private String meetingNumberStr;
  private String meetingDurationStr;
  private String meetingStartTimeDate;
  private String meetingStartTimeStr;
  private String filesSizeStr;
  private String urlSchemeString4OpenFolder;
  private String clusterId;
}
```

FIG. 6C

640

```
** Return Parameter**

Parameter Name | Type | Required | Description |
|:-----|:-----|:-----|:-----|:-----|
||List<RecordingLinkDTO|Y||
|-->recordingCloudLink|String|N||
|-->previewLink|String|N||
|-->passCode|String|N||
|-->recodingLocalLink|List<String>|N||
|-->recodingCloudStatus|int|N||
|-->recodingLocalItemDTOs|List<RecordingLocalItemDTO>|N||   644
|-->meetingId|String|N||
|-->clientIframe|String|N||
```

642

```
**Return Example**

```JSON
[
    {
        "recordingCloudLink": "",
        "previeLink": "",
        "passcode": "",
        "recordingLocalLink": [
            ""
  646   ],
        "recordingCloudStatus": "",
        "recordingLocalItemDTOs": [
            "account_id": "",
            "user_id": "",
            "meeting_id": "",
            "meeting_number_meeting_start_time": "",

● ● ●

"meeting_start_time_date": ",
            "meeting_start_time_str": ",
            "files_size_str": ",
                ● ● ●
        ]
        "meetingId": "",              648
        "clientIframeLink": ""
    }
]
```

FIG. 6D
```

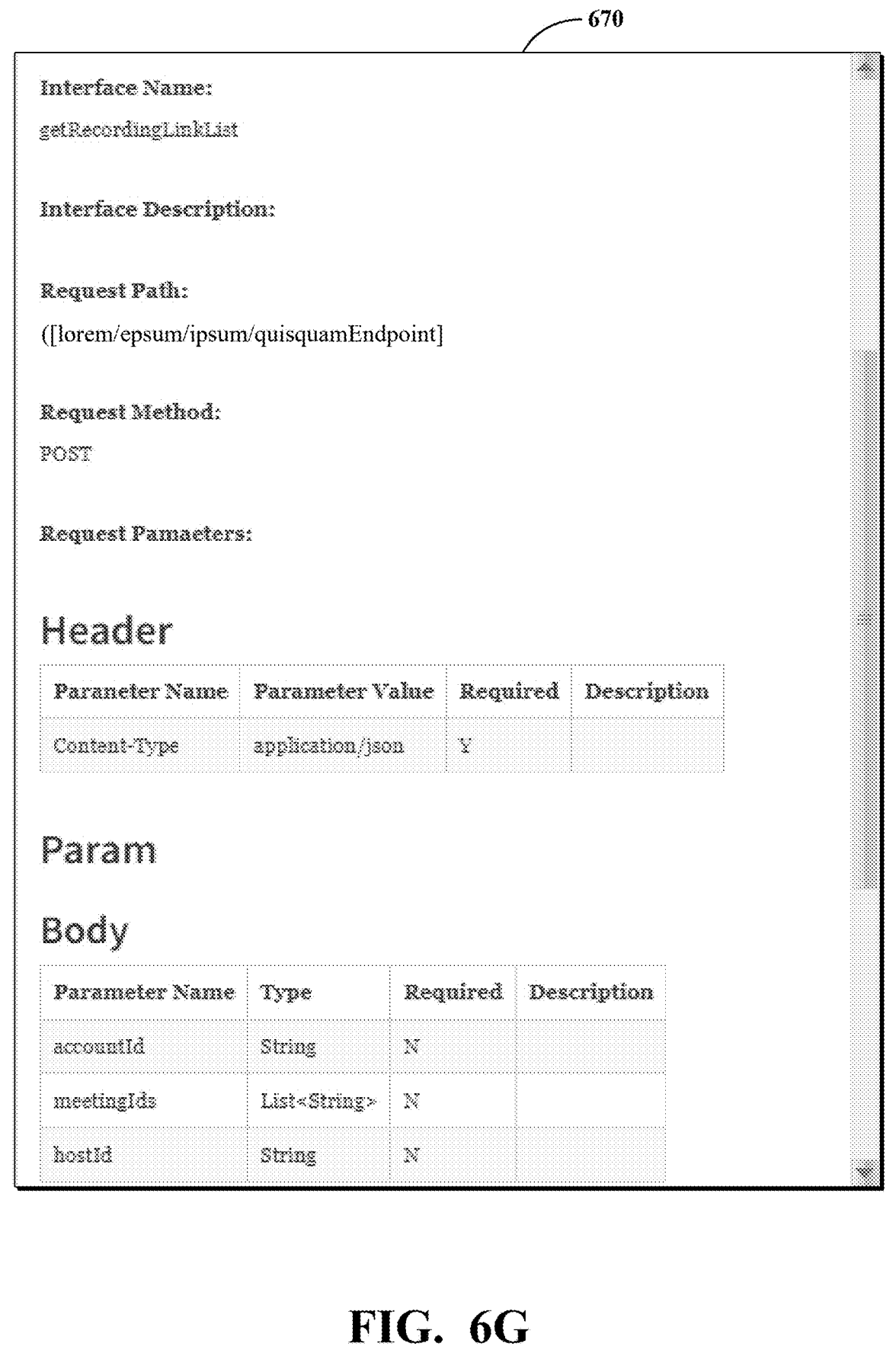

670

Interface Name:

getRecordingLinkList

Interface Description:

Request Path:

([lorem/epsum/ipsum/quisquamEndpoint]

Request Method:

POST

Request Pamaeters:

Header

| Paraneter Name | Parameter Value | Required | Description |
|---|---|---|---|
| Content-Type | application/json | Y | |

Param

Body

| Parameter Name | Type | Required | Description |
|---|---|---|---|
| accountId | String | N | |
| meetingIds | List<String> | N | |
| hostId | String | N | |

FIG. 6G

TEMPLATE-DRIVEN SOURCE CODE DOCUMENTER TOOL

FIELD

This disclosure generally relates to software development, and, more specifically, to template-based automated generation of documentation of source code.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 6C-6D illustrate the functioning of a structure traversing tool.

FIG. 6G illustrates an example of a rendered markdown documentation created with a documenter tool.

DETAILED DESCRIPTION

Figure 1:
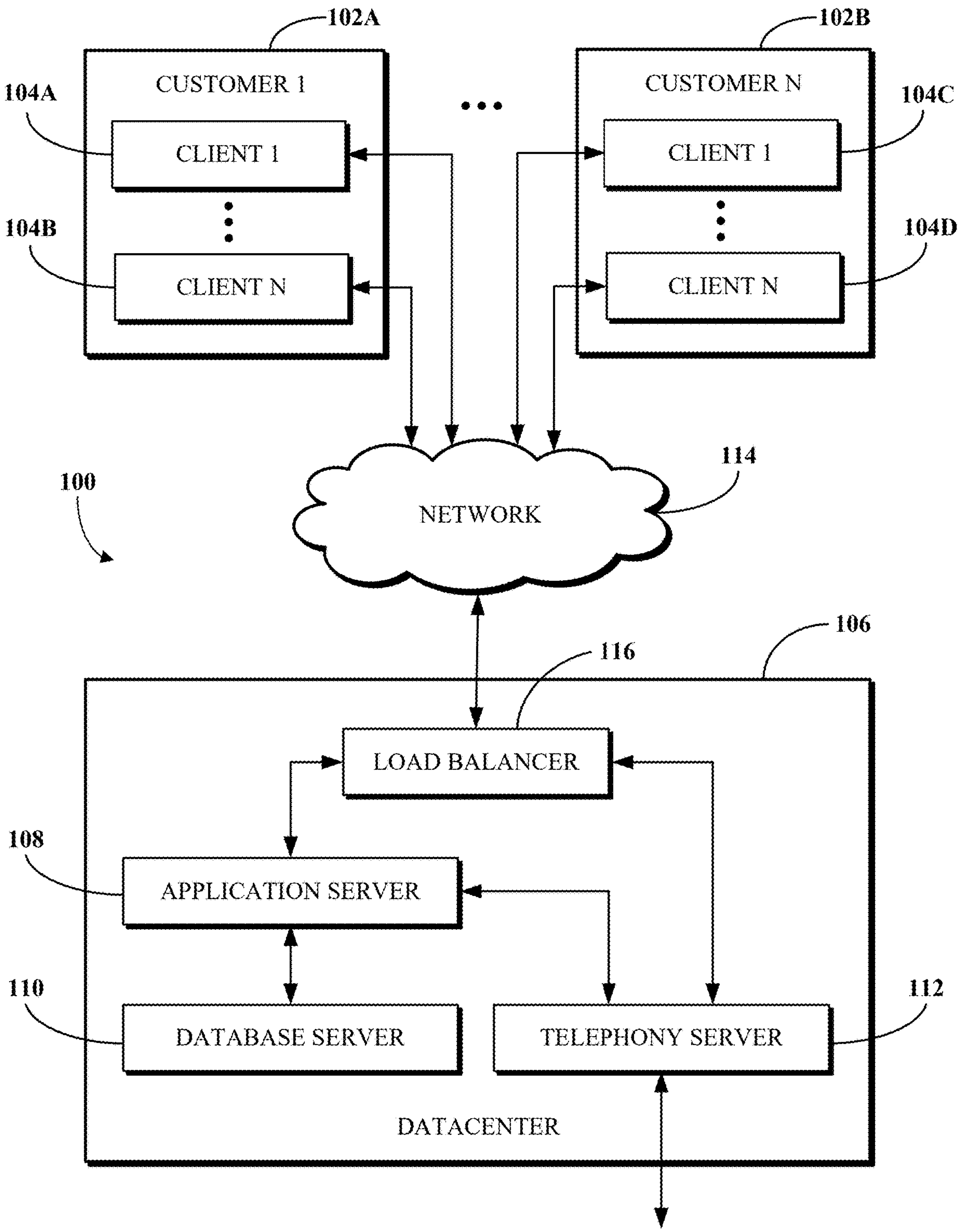
FIG. 1 is a block diagram of an example of an electronic computing and communications system.

Application development (such as the development of a unified communications as a service (UCaaS) platform, a conferencing software, or any other software) often involves the work of multiple teams or developers, each tasked with distinct responsibilities. These teams frequently rely on the interfaces created by one another, necessitating a collaborative and a well-coordinated development environment.

In the context of software development, an interface, such as an Application Programming Interface (API) endpoint, serves as a point of interaction between different software systems or components. These interfaces define a set of rules or protocols through which these interactions occur. For instance, in web development, an API endpoint might define how external applications can request data from a server. The primary purpose of an interface is to enable different software systems to communicate with each other, while abstracting the underlying implementation details.

Documenting an interface involves several key steps. Developers need to clearly describe how the endpoints can be reached (e.g., invoked), what each endpoint or method does, define the expected input parameters, the format of the response, and any possible error messages. Documentation may also include example requests and responses, and possibly a description of the underlying logic. This process is crucial for users of the interface as it provides them with a guide on how to interact with the software effectively. Well-documented interfaces facilitate ease of use, reduce integration time, and minimize potential misunderstandings or misuse of the interface. It also serves as a critical reference tool for future maintenance and updates of the software.

Many tools designed to aid in documenting interfaces are available. For Representational State Transfer (REST) based APIs, tools such as the open-source tools Swagger and API Blueprint are widely used. Such tools allow developers to annotate their source code or write separate configuration files that describe the interfaces. The tools then generate user-friendly, interactive documentation that can be easily navigated and tested by users. For other types of interfaces, tools like Doxygen and Javadoc can automatically generate documentation from annotated source code. These tools help maintain consistency in documentation and streamline the process, making it easier to keep the documentation up-to-date with changes in the code.

Documenting interfaces can be fraught with challenges. One of the primary issues is ensuring that the documentation remains in sync with the actual interface, especially as the software evolves and changes over time. Outdated documentation can lead to significant confusion and errors in usage. Creating comprehensive, yet clear and concise documentation requires considerable effort and diligence, which can be resource-intensive. Ensuring consistency in style and format across different parts of the documentation, especially in large projects with multiple interfaces, adds to the complexity. Additionally, there is often a reliance on the developers to accurately and thoroughly document (e.g., annotate) their work, which can be problematic if not uniformly enforced or if the developers do not update their annotations.

Furthermore, inaccurate documentation can lead to software errors, which directly waste computational resources through additional testing cycles and re-performance of failed tasks during production use of the software. This waste translates to increased investments in processing, memory, and storage, impacting overall system performance. Software errors can contribute to significant computational waste, highlighting the importance of accurate documentation. The possibility for wasted computations resources may result in performance degradation and may result in increased investment in processing, memory, and storage resources and may also result in wasteful energy expenditures (needed to operate those increased processing, memory, and storage resources) and associated emissions that may result from the generation of that energy.

Implementations according to this disclosure are directed to streamlined, automated tools to address the complexities of documenting interfaces. A template-driven tool (referred to herein as a "documenter tool"), deployable as a plugin within an Integrated Development Environment (IDE), automatically generates documentation by analyzing source code. The documenter tool minimizes developer involvement, requiring minimal, if any, developer involvement (such as to create textual annotations or configuration files). The documenter tool adeptly analyzes request and response structures at any depth, thereby enhancing productivity, reducing error potential, and adapting to the evolving nature of software interfaces. Moreover, the documenter tool provides developers with an intuitive platform for creating, editing, and managing interface documentation, ensuring consistency and currency with code changes. Additionally, the tool facilitates easy uploading of this documentation to a central repository, maintaining organization and accessibility for team collaboration.

Implementations according to this disclosure enhance the technical functionality of computers in several ways. For example, the documenter tool analyzes and interprets source code beyond simply extracting data or generating basic outputs. By recursively analyzing the intricacies of function signatures and data structure, a sophisticated understanding of interface structures and behavior are obtained. This deep analysis goes beyond mere data processing and constitutes a technical improvement to the computer's capabilities so that accurate documentation can be generated thereby reducing coding errors and reducing computation resources associated therewith (such as repeated failed compilations or failed integration testing). As another example, the documenter tool extends beyond passive documentation generation. By actively detecting and flagging nested changes in data structures or interface signatures, the documenter tool proactively identifies potentially impacted source code. This early warning system prevents software integration failures that might only emerge during later testing phases, saving significant computational resources and preventing production issues. For example, this early warning system can reduce the number of testing cycles.

In some implementations, a request to generate a documentation of an interface is received. A function signature component of the interface is identified. The structure of the function signature component is recursively analyzed to obtain a recursive documented structure. The recursive documented structure is included in the documentation of the interface.

To describe some implementations in greater detail, reference is first made to examples of hardware and software structures for which the template-driven source code documenter tool can be used and software structures used to implement the documenter tool. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
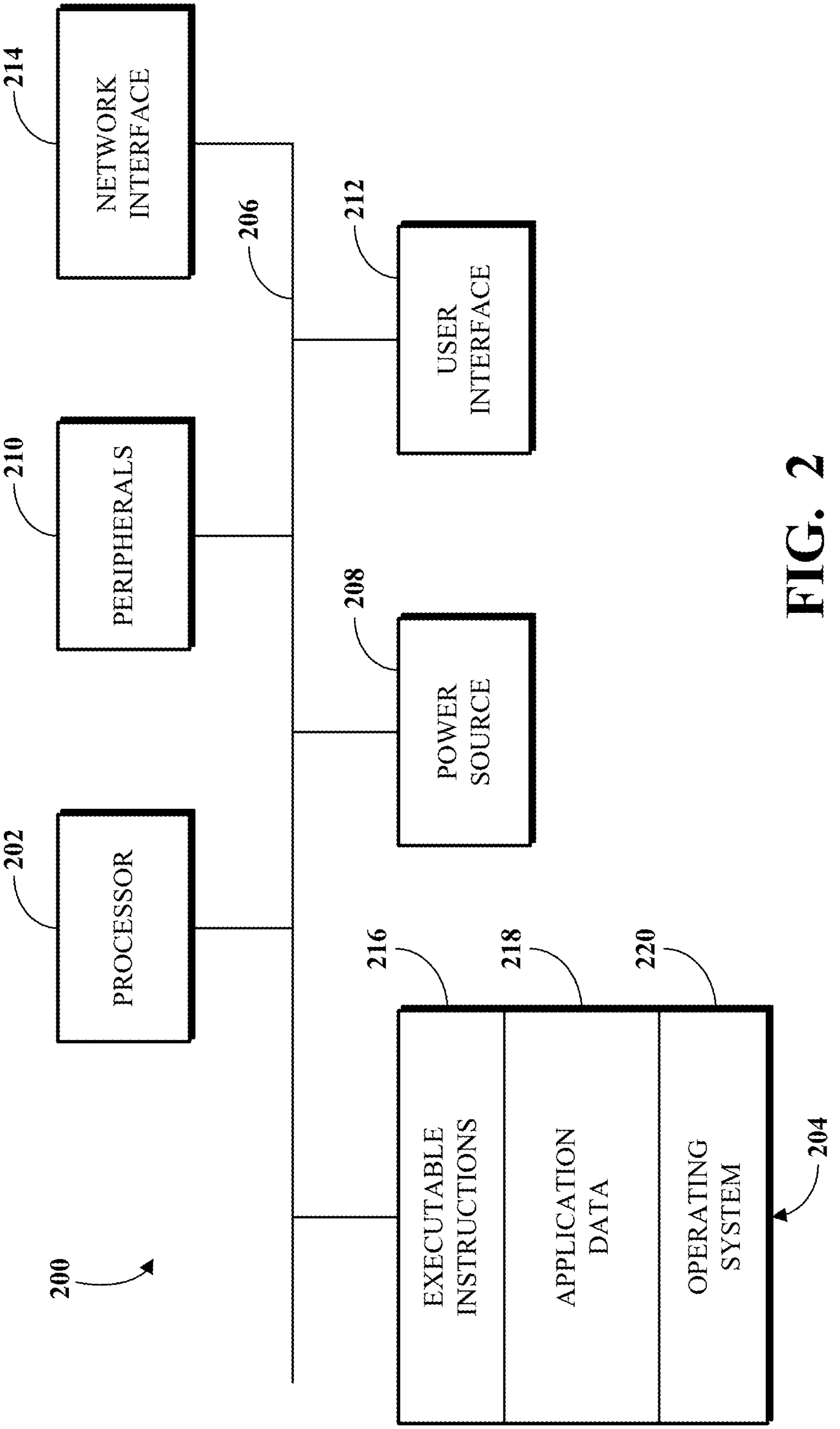
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
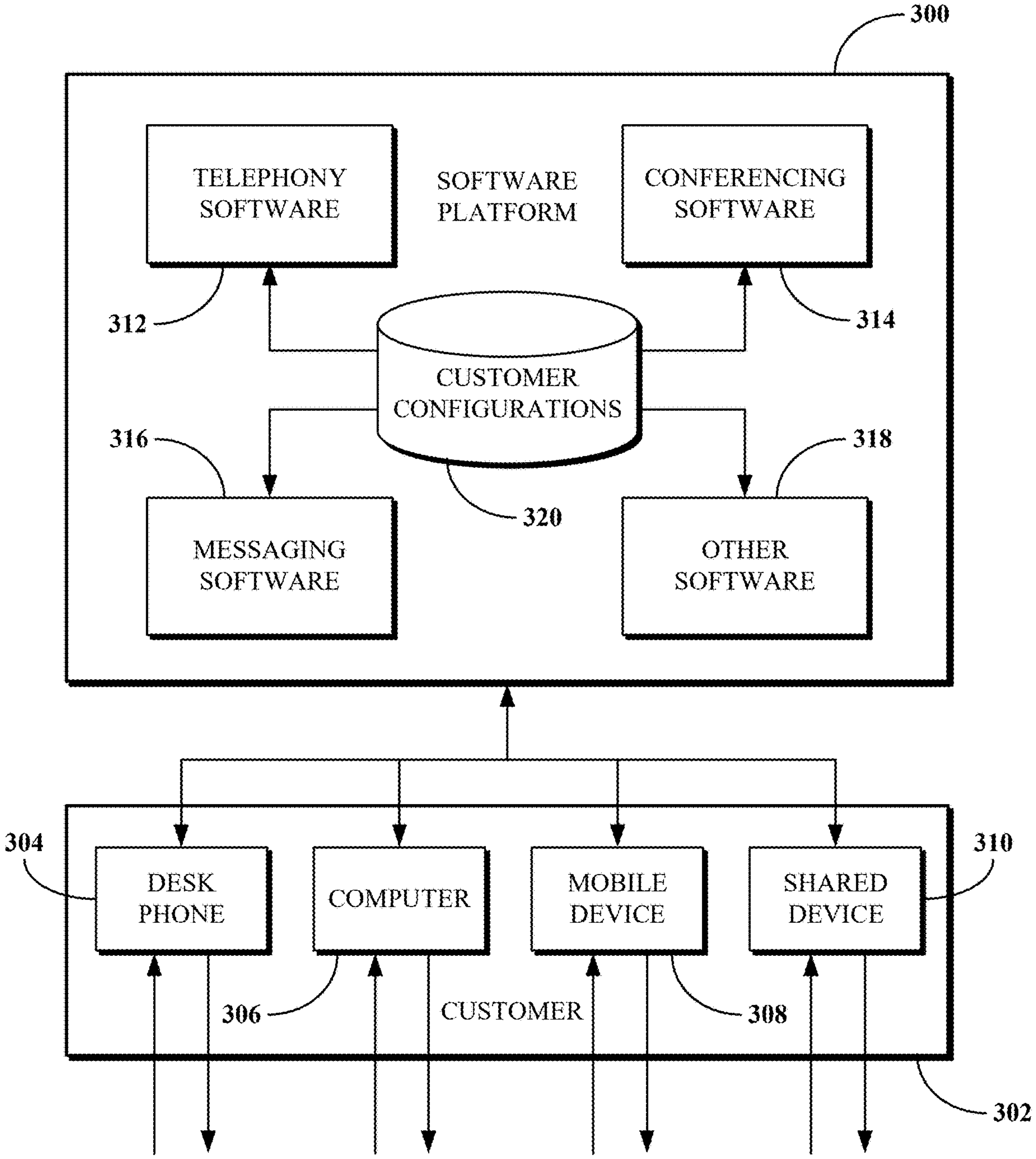
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
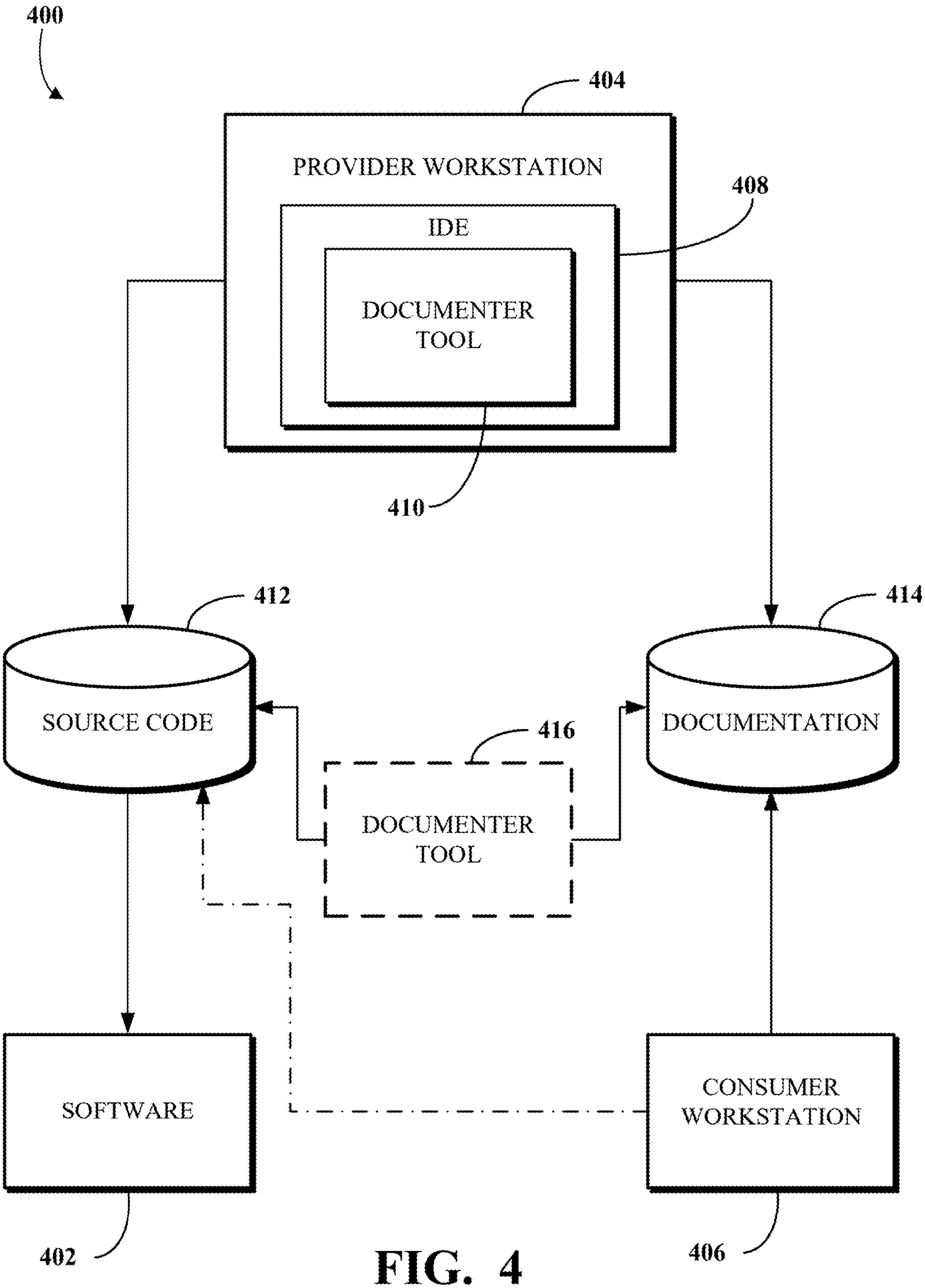
FIG. 4 is a block diagram of a software development environment that facilitates the creation of software.

FIG. 4 is a block diagram of a software development environment 400 that facilitates the creation of a software 402. The environment 400 includes a provider workstation 404 and a consumer workstation 406, each of which can be analogous to the computing device 200 of FIG. 2. The software 402 can be any software. In an example, the software 402 can be a software of the software platform 300 of FIG. 3. As such, the software 402 can be one or more of the telephony software 312, the conferencing software 314, the messaging software 316, or the other software 318 of FIG. 3.

The provider workstation 404 is operated (e.g., is used) by a developer (e.g., a computer programmer) known as an "interface provider," who utilizes an IDE 408 to develop and write source code for the software 402. The IDE 408 provides facilities to developers for software development and may include a source code editor with code completion capabilities, build automation tools, and a debugger.

A documenter tool 410 assists the interface provider in creating and managing documentation for the software interfaces being developed by the interface provider. The documenter tool 410 facilitates the accurate and efficient creation of documentation, which is essential for users (e.g., consumers) of the interfaces (such as an interface consumer associated with the consumer workstation 406) to understand their functionality and integration points.

The environment 400 illustrates that one source code developer (one interface provider) uses the provider workstation 404 to write source code for the software 402. Another developer (the interface consumer), using the consumer workstation 406 may also write code for the software 402 that uses (e.g., calls) some of the code written by the interface provider. As can be appreciated, while FIG. 4 presents a simplified model with a single provider and consumer, the actual environment may encompass a multitude of developers engaging in diverse development tasks.

The source code developed at the provider workstation 404 and/or the consumer workstation 406 can be stored in a source code repository 412 where the source code is saved and managed. The source code repository 412 may, inter alia, enable (e.g., allow for or facilitate) version control and collaboration among multiple developers. The software 402 represents the culmination of the collaborative efforts of the software development process, encompassing the compiled or interpreted body of code derived from the source code repository 412. Processes, such as continuous integration and/or continuous deployment pipelines, may be used to prepare the software 402 for execution or release to the end-users.

The interface consumer associated with the consumer workstation 406 may leverage (e.g., call or implement) the interfaces provided by the source code from the source code repository 412. The interface consumer can access and integrate the documented interfaces into their own software projects. Documentation for the interfaces, accessible from the documentation repository 414, assists the consumer in understanding and effectively using the available interfaces.

The documenter tool 410 is shown as being deployed (e.g., integrated) in the IDE 408. The documenter tool 410 can be deployed (e.g., configured to function) as a plugin into the IDE 408. A plugin is a software component that adds a specific feature to an existing computer program, in this case, the IDE 408. When installed, the documenter tool 410 enables additional functionality in the IDE 408, with or without altering the core capabilities of the IDE 408. The documenter tool 410, once deployed, provides developers with the means to create, manage, and access documentation directly from within the IDE 408. In other implementations, the documenter tool 410 can be deployed outside of and work in conjunction with the IDE 408. While not specifically shown, a documenter tool can also be employed at the consumer workstation 406.

A documenter tool 416, represented by dashed lines, may additionally, or alternatively, be available. The documenter tool 416 generates documentation directly from the source code repository 412. For example, the documenter tool 416 may be provided with a list of interface names, a documentation template (described below), and the documenter tool 416 generates documentation, as described herein, for at least some of the interfaces in the list. Interfaces, classes, and the like may be grouped into projects in the source code repository 412. As such, the list of interface names may be provided as a project name, from which the documenter tool 416 obtains the list of interfaces to generate documentation for.

Figure 5:
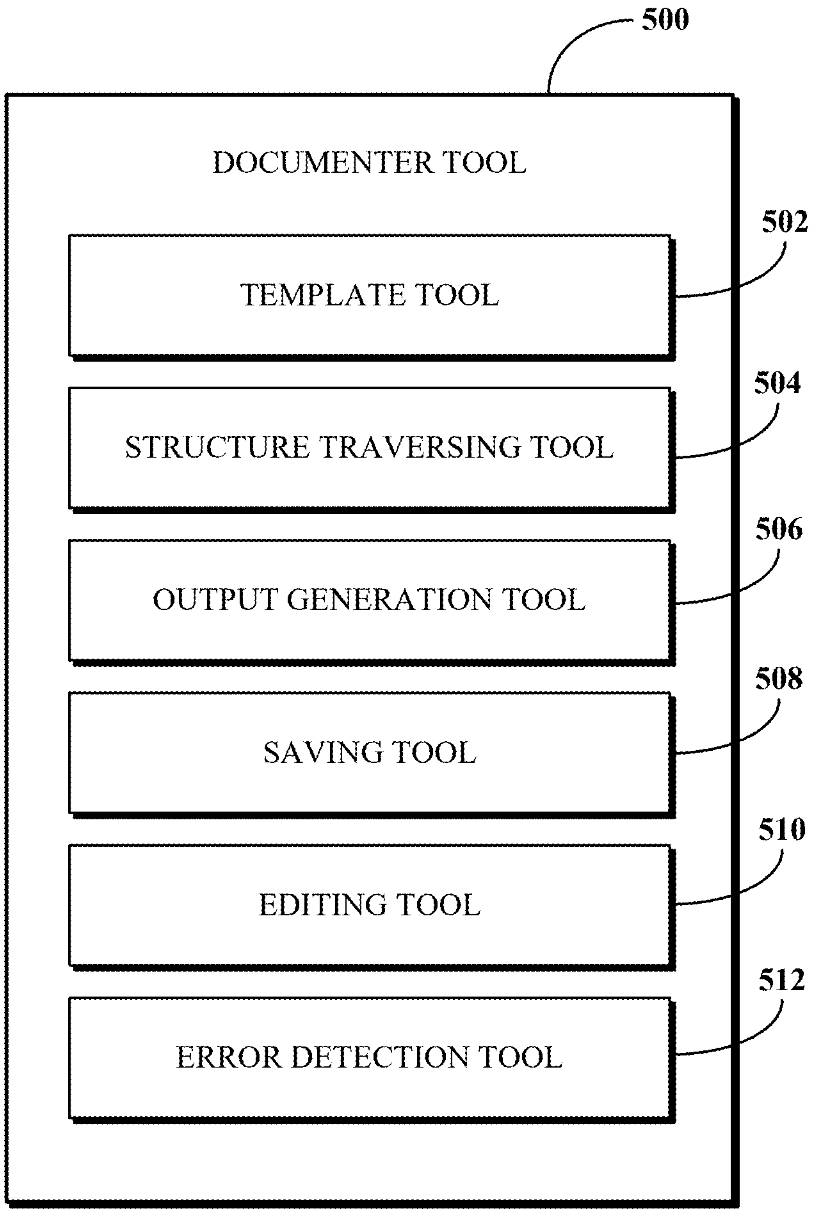
FIG. 5 is a block diagram of example functionality of a documenter tool.

FIG. 5 is a block diagram of example functionality of a documenter tool 500, which may be, for example, one or more of the documenter tool 410 or the documenter tool 416 of FIG. 4. The documenter tool 500 includes tools, such as programs, subprograms, functions, routines, subroutines, operations, executable instructions, and/or the like for, inter alia, and as further described below, automatically generating documentation from source code. Aspects of the documenter tool 500 are further described and illustrated with respect to FIGS. 6A-6G.

At least some of the tools of the documenter tool 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the documenter tool 500 includes a template tool 502, a structure traversing tool 504, an output generation tool 506, a saving tool 508, an editing tool 510, and an error detection tool 512. In some implementations, the documenter tool 500 can include more or fewer tools. In some implementations, some of the tools may be combined, some of the tools may be split into more tools, or a combination thereof.

The documenter tool 500 can parse source code to generate documentation therefor and therefrom. The documenter tool 500 can be used to document interfaces and APIs. In web development, "interfaces" or "endpoints" are specific routes or Uniform Resource Locators (URLs) that enable client-server interaction. Routes can be defined as configurations (such as in a configuration file or codebase of a web server), each mapped to a handler function that processes requests and generates responses, thereby facilitating communication between different software applications via APIs.

HyperText Transfer Protocol (HTTP) endpoints include a set of communication rules for HTTP services, including URLs, request methods (GET, POST, PUT, DELETE), request parameters, data format, and response structure. Developers employ these interfaces or APIs to facilitate client-server interactions. An interface, in this scenario, acts as a contractual agreement the server adheres to upon receiving a compliant request.

As a simple, non-limiting illustration of interfaces (e.g., endpoints or routes), consider a simple web service for managing a list of tasks in a to do list. This service might expose several HTTP endpoints (routes) for creating, retrieving, updating, and deleting task. These endpoints form the interfaces of the web API. The web service may define the following routes and respective methods (e.g., GET, POST, PUT, and DELETE): 1) GET/api/tasks usable to retrieve all tasks; 2) POST/api/tasks usable to create a new task; 3) PUT/api/tasks/:id usable to update an existing task identified by id, and 4) DELETE/api/tasks/:id usable to delete an existing task identified by id.

The template tool 502 can be used to configure a documentation template (or simply template, for brevity) according to which documentation for an interface is to be generated. A template provides a standardized layout and structure for generating and presenting the documentation, ensuring consistency across documentation files. The template tool 502 enables a user (e.g., a developer) to define templates with placeholders for different aspects of an API interface, which can be automatically filled in (e.g., interpolated) with specific details (e.g., values) when documenting an API. Using templates can ensure that necessary information is included and presented in a uniform manner. For instance, when documenting a new endpoint, the source code and other commentary data provided by the developer can be used to obtain values for the placeholders and the documenter tool 500 would generate the complete documentation in a particular format, ready to be displayed on a website or in a development tool that supports formatting of that particular format.

The template tool 502 may support any number of documentation formats, such as HTML, plain text, reStructuredText, AsciiDoc, Wiki Markup, or Unix/Linux Man pages, to name a few. In an example, the Markdown format (which is illustrated herein) may be used. Markdown is a lightweight markup language with plain-text-formatting syntax that is often used for writing documentation on the web. It enables developers to style their text by denoting certain characters or sequences, such as asterisks for bold or underscores for italics, without requiring Hyper Text Markup Language (HTML) markup or knowledge. Markdown may be used due to its readability and ease of conversion to HTML. To illustrate, headings can be created using the pound sign (#) followed by a space and the heading text; the number of pound signs used determines the level of the heading. Bold text can be written by surrounding words with double asterisks, while italicized text using single asterisks. Lists can be created using dashes (-) or numbers followed by periods for unordered and ordered lists, respectively. Hyperlinks can be embedded using square brackets for the link text followed by parentheses containing the URL, and images can be similarly embedded with an exclamation mark in front of the square brackets, containing the alt text, followed by the URL in parentheses. Code blocks can be indicated by enclosing text within backticks for inline code or triple backticks for larger code blocks. Each of these elements can be interpreted by a Markdown processor and typically rendered into HTML for viewing in a web browser.

The structure traversing tool 504 analyzes and navigates through object classes, complex data structures, structs, or the like (collectively, data structures). The structure traversing tool 504 receives a data structure (e.g., the name of the data structure or some other identifier of the data structure) and examines the composition of data elements therein and delineates their hierarchical organization. The structure traversing tool 504 can be said to unravel nested structures, revealing not just the top-level members but traversing into any non-basic data type members that may themselves contain additional nested elements.

The term "basic data type" defines or corresponds to data types that the structure traversing tool 504 recognizes as atomic or indivisible, meaning that they are not decomposed further into more fundamental types within the context of the operations of the structure traversing tool 504. Basic data types do not encompass nested or composite structures and represent singular values. In the Java programming language, such basic data types may include the primitive data types (e.g., byte, short, int, long, float, double, boolean, and char) and String. Additionally, the structure traversing tool 504 may also be configured to treat wrapper classes (e.g., Integer, Long, Double, and similar objects) as basic data types, along with other classes that are marked or configured to be treated as non-traversable.

The structure traversing tool 504 dynamically identifies the structure of a data element from the source code itself by parsing the definitions of data structures, interfaces, and other complex types to construct a tree of their relationships and dependencies.

The output generation tool 506 automates the creation of documentation. The output generation tool 506 operates by parsing a template configured via the template tool 502 where the template outlines the structure and format of the desired documentation. The output generation tool 506 recognizes and replaces the placeholders of the template with actual data. The output generation tool 506 may use the structure traversing tool 504 to obtain at least some of the actual values. The placeholders correspond to specific pieces of information, such as function (e.g., method in the Java programming language) names, descriptions, parameters, and other relevant data extracted from the source code. As the output generation tool 506 processes the template, it resolves each placeholder by fetching the corresponding data from the IDE or the source code itself.

The saving tool 508 stores documentation generated by the output generation tool 506 to a documentation repository, such as the documentation repository 414 of FIG. 4. That is, the saving tool 508 can facilitate the transfer of newly generated or updated documentation from the documenter tool 500 or the IDE to the documentation repository. To commit (e.g., save) documentation to the documentation repository, a developer may have to provide authentication information.

The developer may be prompted to enter (or may preconfigure) specific project configuration details, including an endpoint or API (e.g., a URL such as/api/item/updateApi) of the documentation repository and any necessary API keys and/or tokens. In this context, an API key can be a unique identifier used to authenticate a developer or a calling application (e.g., the IDE 408 of FIG. 4 or the documenter tool 500) to an API (e.g., the endpoint of the documentation repository). The token (also referred to as an access token) may be a credential that can be used by the application to access the API. These credentials can be essential for the saving tool 508 to gain access to the endpoints of the documentation repository, if the documentation repository is configured to require authentication.

The editing tool 510 enables the developer to provide or to modify content for at least some of the placeholders. The developer may provide or modify the content via user interfaces generated by the editing tool 510. The functioning of the editing tool is further illustrated with respect to FIG. 6E.

The error detection tool 512 identifies discrepancies (e.g., inconsistencies) between the current state of the source code and previously generated documentation associated therewith. Uncorrected discrepancies in documentation could lead developers (e.g., consumers) to use deprecated code patterns or to misapply API features, leading to bugs or system malfunctions. As such, the error detection tool 512 can ensure that documentation remains a reliable source of information for developers, preventing potential misunderstandings or errors that could arise from outdated documentation.

To illustrate, if a developer modifies any aspect of a nested data structure, the error detection tool 512 can flag any pre-existing documentation that no longer reflects these changes. Other non-limiting conditions that may trigger alerts from the error detection tool 512 include renamed functions, altered method signatures, or updated parameters that are not correspondingly updated in the documentation. Discrepancies can be flagged in any number of ways. In one example, icons or error flags may be displayed in the IDE, such as in association with an interface whose documentation the error detection tool 512 determines to be inconsistent. In another example, a report may be provided (e.g., transmitted or displayed) to a developer listing identified discrepancies.

Figure 6A:
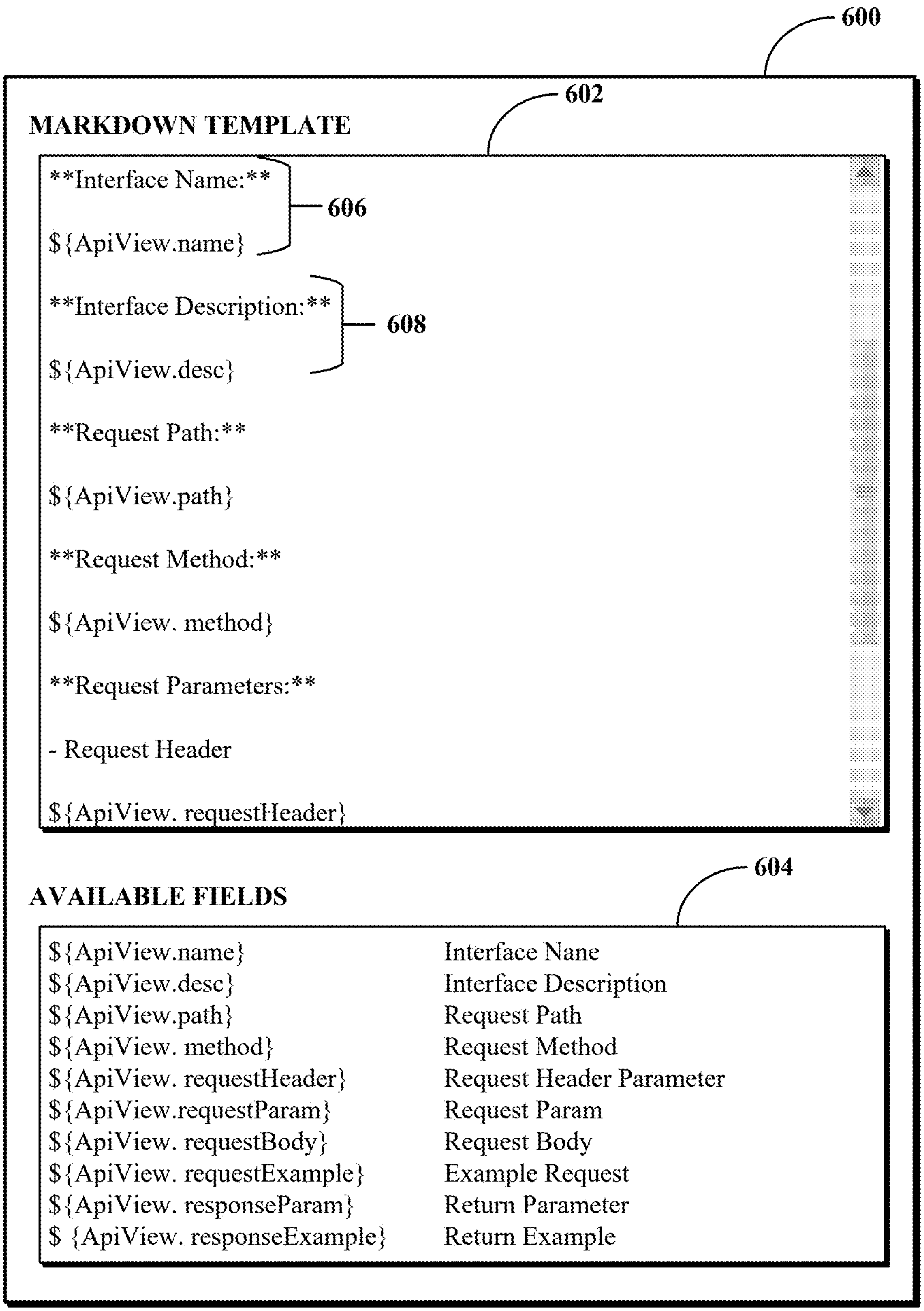
FIG. 6A illustrates a user interface for configuring a documentation template.

FIG. 6A illustrates a user interface 600 for configuring a documentation template. The user interface 600 may be generated (e.g., displayed) by a template tool, such as the template tool 502 of FIG. 5, such as in response to a provider developer invoking an action in an IDE, such as the IDE 408 of FIG. 4. The user interface 600 includes a template configuration section 602 and an available placeholders list 604.

The template configuration section 602 is an editable area (e.g., a text box) that a developer can use to configure the format and style of the documentation template. In FIG. 6A, a Markdown template is being configured. However, as already mentioned, other formats are possible. The template configuration section 602 can be configured to include various placeholders within the Markdown syntax, such as Interface Name: ${ApiView.name} (e.g., an element 606) and Interface Description: ${ApiView.desc} (e.g., an element 608).

Placeholders in the template, such as ${ApiView.name}, ${ApiView.desc}, and so forth, are variables that are dynamically replaced (e.g., interpolated) with actual values from the interface being documented. When the template is processed, such as by the output generation tool 506 of FIG. 5, any placeholders in the template are resolved with corresponding details from the API, such as its name, description, request method, and request parameters, among others.

The available placeholders list 604 provides a reference for developers, listing the placeholders that can be used within the documentation template (e.g., configured in the template configuration section 602). Each placeholder corresponds to a specific piece of information about the API. The list serves as a guide to ensure that developers use the correct syntax for placeholders so that generated documentation is accurate and consistent.

The available placeholders list 604 is shown as including certain placeholders. However, the disclosure is not so limited and more, fewer, or other placeholders may be available. The placeholder ${ApiView.name} inserts (e.g., causes to be inserted) the name of the API interface; ${ApiView.desc} inserts the detailed description of the interface, which may be extracted from comments provided by the developer; ${ApiView.path} inserts the endpoint URL path (e.g., route) of the API, ${ApiView.method} indicates the type of HTTP method to be used for the request; and ${ApiView.requestHeader} and ${ApiView.requestParam} detail the headers and parameters required for the request, respectively. The ${ApiView.requestBody} placeholder can be used to describe the expected structure of a request body, ${ApiView.requestExample} can be used to provide a typical example of an API request, ${ApiView.responseParam} can be used to enumerate the parameters anticipated in the response, and ${ApiView.responseExample} can be used to provide an illustrative example of an API response.

Figure 6B:
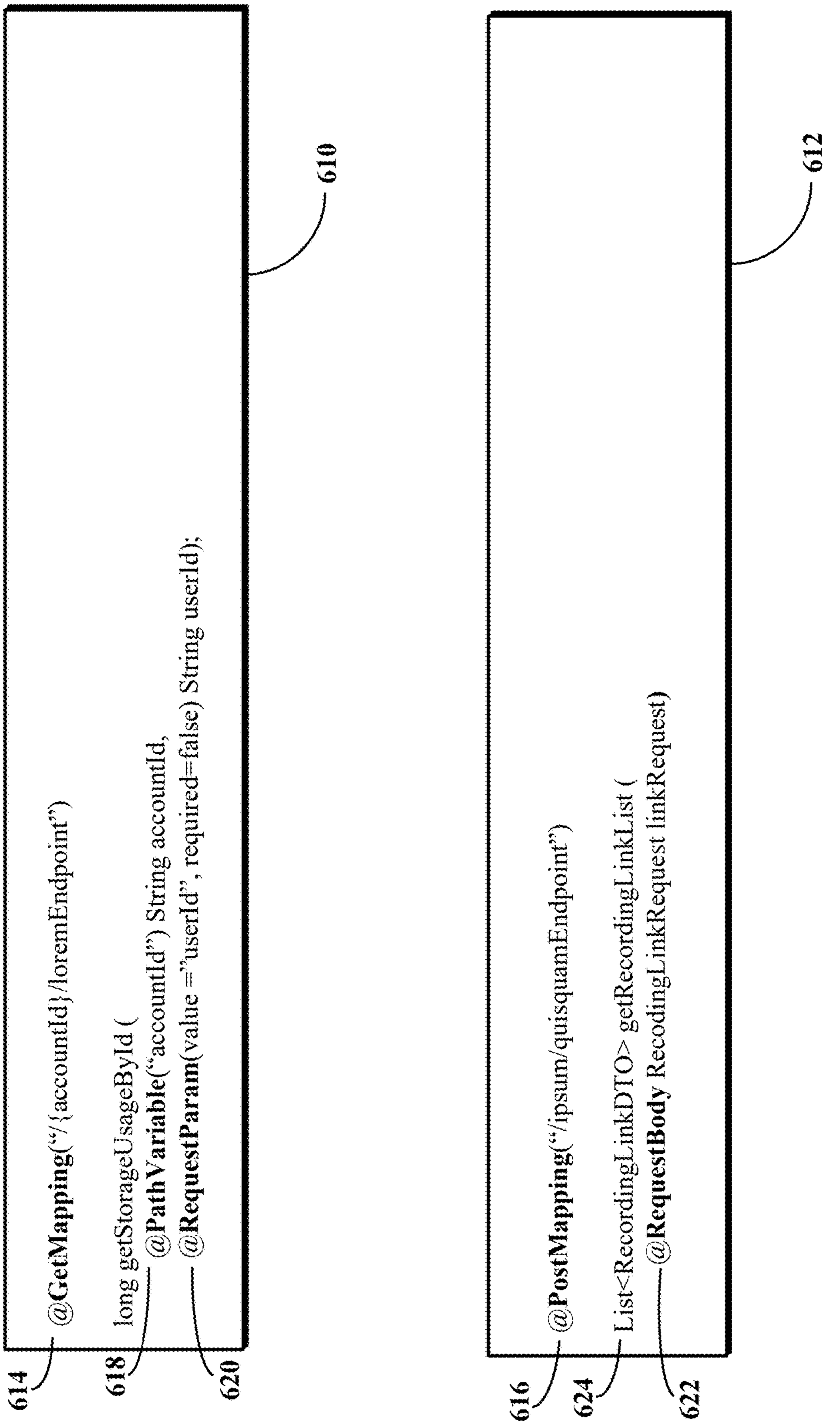
FIG. 6B illustrates examples of interpolating documentation template placeholders based on structural elements of a development framework.

At least some of these placeholders may be populated (e.g., interpolated or substituted) based on structure conventions of a development framework used in the development of a software application, such as the software 402 of FIG. 4, as described with respect to FIG. 6B.

FIG. 6B illustrates examples of interpolating documentation template placeholders based on structural elements of a development framework. FIG. 6B includes a first code snippet 610 and a second code snippet 612, which may be source code written in the IDE 408 of FIG. 4 or source code stored in the source code repository 412 of FIG. 4.

The documenter tool 500 of FIG. 5 can be implemented to interpret structural conventions of one or more development frameworks. A development framework is a comprehensive platform that provides a foundation for building software applications. A development framework may include pre-written code, set of conventions, and a suite of tools that developers utilize to streamline the development process and facilitate consistent, efficient, and scalable application development. The examples used herein illustrate structural conventions of the Spring framework. However, the disclosure is not limited to or by any particular framework. By understanding these structural conventions, the documenter tool 500 can automatically generate accurate documentation that aligns with the source code implementation.

The first code snippet 610 includes some Spring annotations; namely, an annotation 614 (e.g., @GetMapping), an annotation 616 (e.g., @PostMapping), an annotation 618 (e.g., @Path Variable), an annotation 620 (e.g., @RequestParam), and an annotation 622 (e.g., @RequestBody). Other annotations are possible. The output generation tool 506 uses placeholders in a documentation template to extract information from the source code annotated with Spring annotations, including but not limited to the annotations described herein. Accordingly, the documentation can accurately reflect the way an API endpoint should be called and what parameters it expects.

The @GetMapping and @PostMapping annotations in Spring can be used to map HTTP requests to specific controller methods. In a documentation template, placeholders related to these annotations would be populated as follows: the placeholder ${ApiView.method} would be replaced with "GET" for @GetMapping and "POST" for @PostMapping, indicating the HTTP method type for the API endpoint; and the value provided in the @GetMapping (e.g., "/{accountId}/loremEndpoint") or @PostMapping (e.g., "/ipsum/quisquamEndpoint") annotation would populate the ${ApiView.path} placeholder with the specific Uniform Resource Identifier (URI) path for the API endpoint.

The @RequestParam, @Path Variable, and @RequestBody annotations can be used to indicate how a method parameter should be bound to a web request parameter. Placeholders related to these annotations can be populated as follows: the placeholder ${ApiView.requestParam} would be populated with the name and details of parameters annotated with @RequestParam, specifying query parameters expected in the request; if there is a placeholder for path variables, the placeholder ${ApiView.requestParam} would be populated with the data from the @Path Variable annotations, specifying variables within the URI path; and the placeholder ${ApiView.requestBody} would be populated with the structure expected in the request body, as indicated by the @RequestBody annotation.

A method signature in programming (generically referred to herein as a "function signature") defines the interface by which a method (generically referred to herein as a "function") can be called or invoked and includes the function name, the number and type of its parameters, and the return type. In the case of the getStorageUsageById( ) function of the first code snippet 610, the signature specifies that it returns a long data type and accepts two parameters: accountId of type String and userId of type String. Generically, these elements (e.g., the return type and the types and/or names of the input parameters) are referred to herein as "function signature components."

FIGS. 6C-6D illustrate the functioning of a structure traversing tool, such as the structure traversing tool 504 of FIG. 5. The structure traversing tool analyzes data structures and their relationships, providing a comprehensive representation of complex data hierarchies. As mentioned above, the structure traversing tool may receive a data type and generates an output that reflects its nested structure. The structure traversing tool may be used while processing at least the documentation template placeholders ${ApiView. requestExample} and $ {ApiView. responseExample}.

The second code snippet 612 of FIG. 6B is used as an illustration. The second code snippet 612 indicates that the function getRecodingListList( ) when called, returns a list of objects of the type RecordingLinkDTO. A class definition 630 of FIG. 6C represents the RecordingLinkDTO data structure, which defines a set of member variables, such as recordingCloudLink, previewLink, and passCode. The semantics of the member variables are irrelevant to the understanding of this disclosure. The class definition 630 includes the data member recordingLocalItemDTOs of type List<RecordingLocalItemDTO>, which is a collection of RecordingLocalItemDTO objects, indicating that it is not a basic data type (i.e., a non-basic data type) but rather a complex or composite data structure (e.g., data type). A class definition 634 details the structure of the complex data type RecordingLocalItemDTO. That is, class definition 634 delineates the member variables of the RecordingLocalItemDTO class, such as accountId, userId, and meetingId, among others.

When presented with a class such as RecordingLinkDTO, the structure traversing tool systematically identifies each member, determining whether it is a basic data type or requires further exploration (i.e., whether it is a non-basis data type). For instance, should the structure traversing tool encounter a member that is a complex type, such as recordingLocaltemDTOs, which is a list of another class, it does not simply list this as a member. Instead, the structure traversing tool recursively analyzes the structure of the class (i.e., RecordingLocalItemDTO) of the data member recordingLocaltemDTOs, enumerating all its members, including nested objects and their respective types. This recursive approach allows the structure traversing tool to construct a detailed map of nested data structures, as exemplified in FIG. 6D.

FIG. 6D illustrates examples of outputs of interpolation of documentation template placeholders. Specifically, an output 640 is a structured table, in Markup format, detailing the parameters of an API's return value, including parameter names, types, whether the parameters are required, and a brief description for each. The output 640 is generated by interpolating the ${ApiView.responseParam} placeholder with actual data based on the second code snippet 612 of FIG. 6B. An output 642 is a formatted JavaScript Object Notation (JSON) object, also in Markup format, that illustrates a return example from the API of the second code snippet 612, generated by interpolating the ${ApiView.responseExample} placeholder with a sample response data structure.

The output 642 includes an entry 644 corresponding to the return parameter recodingLocalItemDTOs indicating that it is a list of RecordingLocalItemDTO objects. The output 646, within the output 642, includes the details of this nested structure, showing how the recordingLocalItemDTOs list comprises objects with multiple fields corresponding to the class definition 634 of FIG. 6C. Ellipses, such as an ellipsis 648, indicate that the JSON object (e.g., the output 642) has additional content that is, for brevity, not shown. If one of the these fields were itself a non-basic data type, then the output 642 would include further nested structures.

Figure 6E:
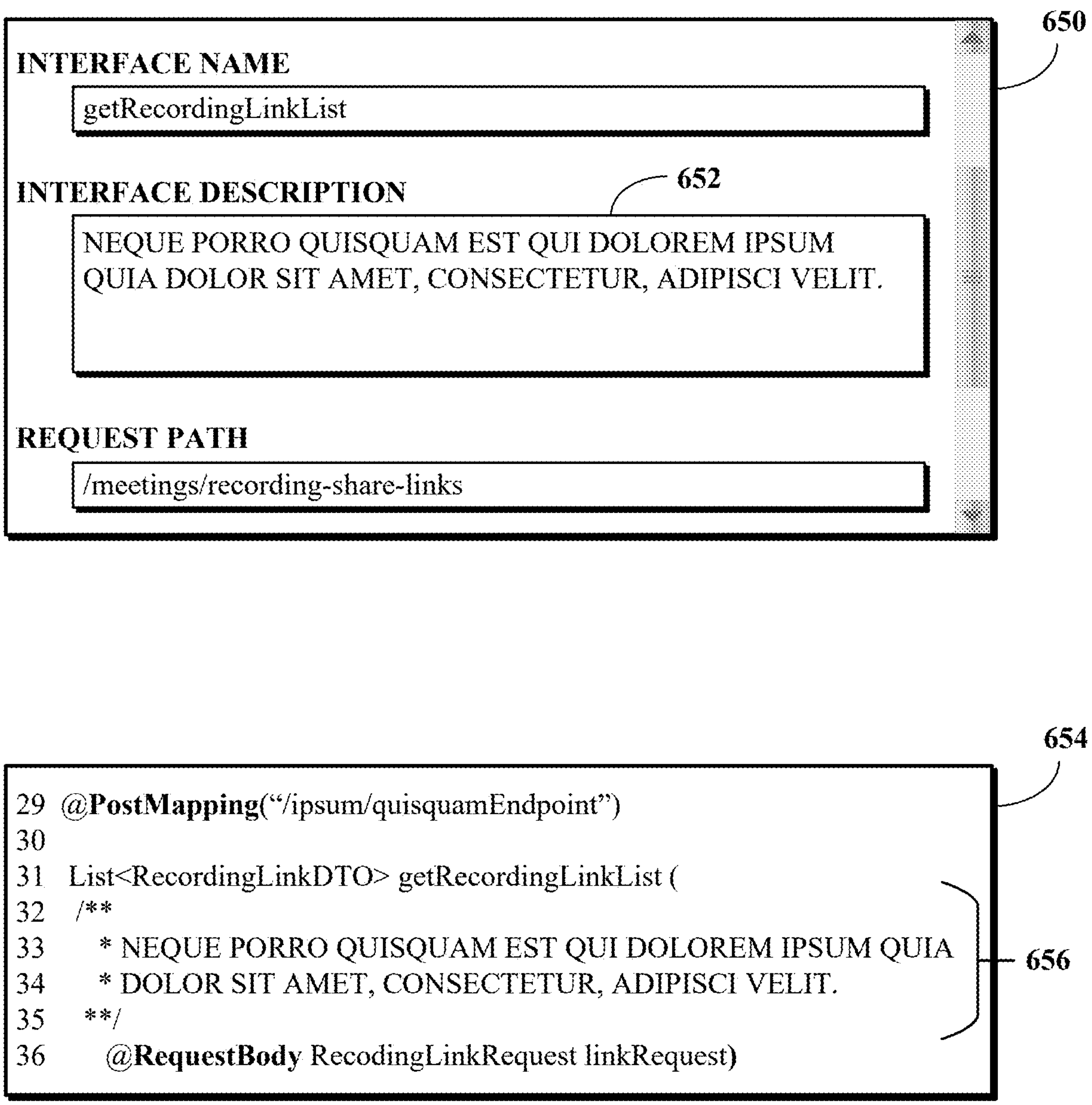
FIG. 6E illustrates the functioning of an editing tool of a documenter tool.

FIG. 6E illustrates the functioning of an editing tool of a documenter tool, such as the editing tool 510 of FIG. 5. The editing tool may present (e.g., output) an editing window 650, such as in response to the developer invoking an action in the IDE 408 of FIG. 4 with respect to the API function getRecordingLinkList( ) The editing window 650 enables the developer to input or revise the documentation directly. A field 652 illustrates that the developer has provided an interface description. That is the developer has provided a value for the placeholder ${ApiView.desc}.

In response to the developer accepting the edits made in the editing window 650, the editing tool updates the source code. An IDE view 654 shows a few lines of code that may be displayed in the IDE 408 of FIG. 4. The IDE view 654 illustrates that the editing tool inserted comment lines 656 in the source code corresponding the text provided in the field 652. Conversely, if the developer had already provided the comment lines 32-35 in the IDE editor, then the editing tool would pre-populate the field 652 with what the developer provided in the source code.

Figure 6F:
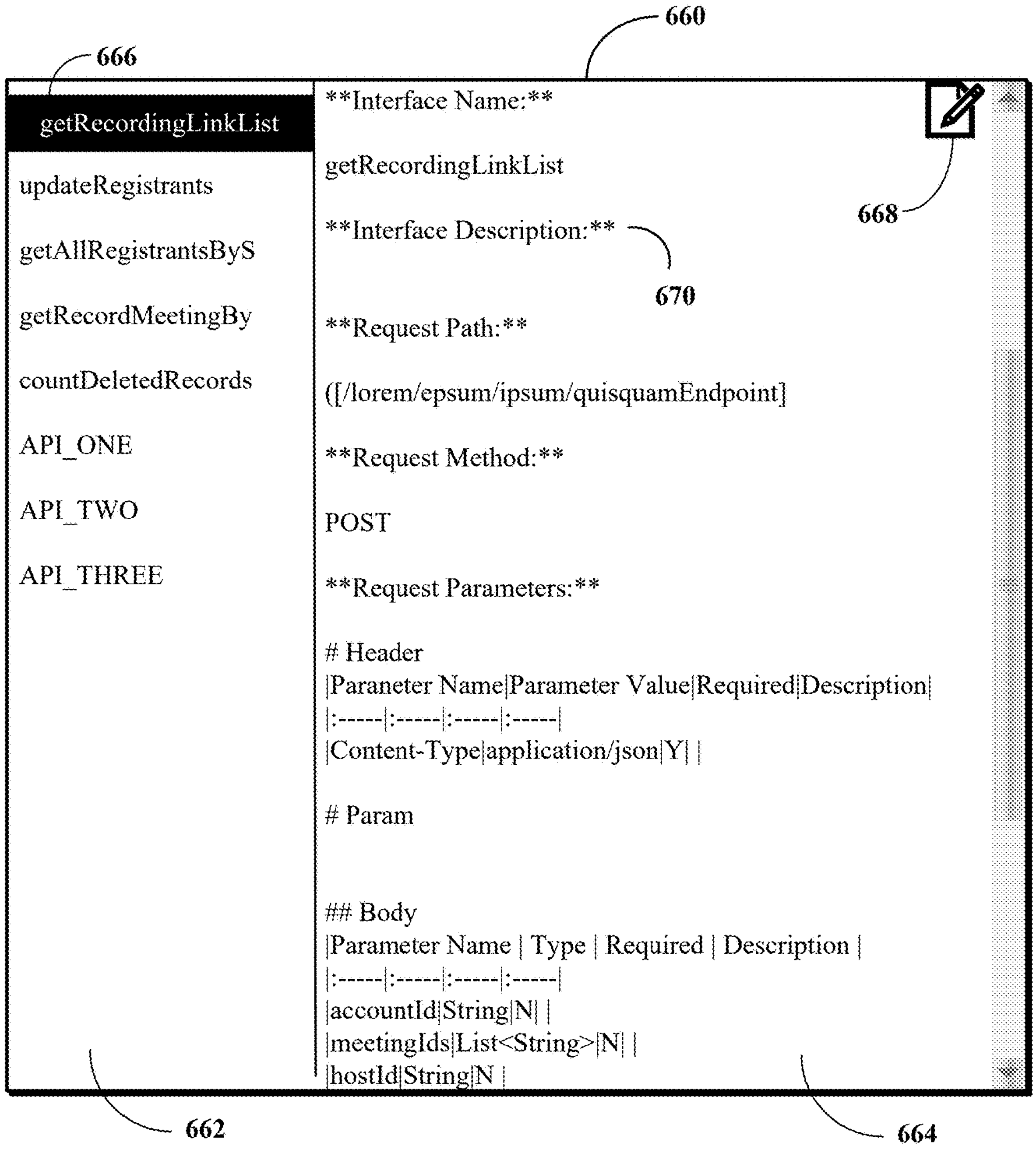
FIG. 6F illustrates a user interface of a documenter tool.

FIG. 6F illustrates a user interface 600 of a documenter tool, such as the documenter tool 500 of FIG. 5. The user interface 600 is usable for generating, reviewing, or editing documentation for multiple interfaces. A list 662 shows a list of API endpoints. In an example, the developer may select a project and the list 662 can then be populated by all the APIs within the project. This list 662 serves as an index, allowing a developer to select an API for which documentation is to be viewed or edited in a previewer 664.

The previewer 664 shows the documentation for the API selected in the list 662, such as a selected API 666. The documentation shown in the previewer 664 is generated according to a predefined documentation template, as described herein. The content within the previewer 664 shows the interpolated (e.g., resolved or substituted) template placeholders, formatted in Markdown. As described herein, placeholders are substituted with actual values and descriptions corresponding to the selected API.

An edit control 668, when selected, enables the developer to edit the documentation displayed in the previewer 664. For example, in response to the developer invoking the edit control 668, an editing window, which can be or can be similar to the editing window 650 of FIG. 6E, may be displayed by the documenter tool 500 therewith enabling the developer to edit the documentation (e.g., to edit content corresponding to a placeholder). To illustrate, as the documentation does not include content for the placeholder ${ApiView.desc} corresponding to a section 670, the developer can provide the content via the editing window, as described with respect to FIG. 6E.

FIG. 6G illustrates an example 670 of a rendered markdown documentation created with a documenter tool, such as the documenter tool 500 of FIG. 5. The example 670 corresponds to the markdown document shown in the previewer 664 of FIG. 6F. The example 670 illustrates an HTML rendering of the markdown document. In an example, via a web browser of a consumer workstation, such as the consumer workstation 406 of FIG. 4, a consumer developer may access the markdown document from a documentation repository, such as the documentation repository 414 of FIG. 4. In another example, the consumer developer may access the markdown document from within an IDE. In an example, the documentation repository may store HTML versions of the markdown documents stored therein. As such, the consumer developer may access the HTML version. In another example, the consumer developer may access the markdown version and the markdown version may be locally (i.e., at the consumer workstation) converted to HTML for rendering.

Figure 7:
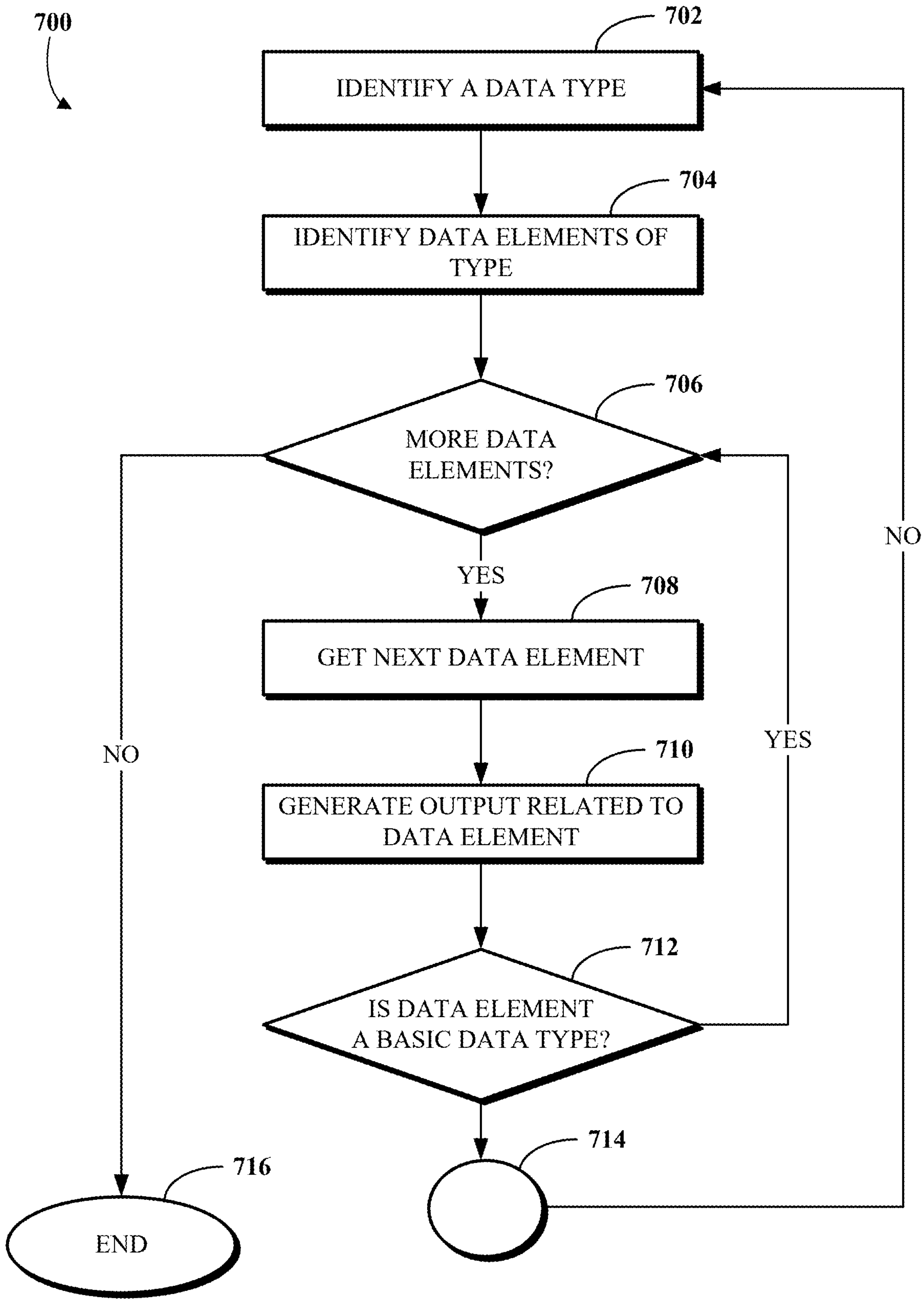
FIG. 7 is a flowchart of an example of a technique for traversing a nested data structure.

To further describe some implementations in greater detail, reference is next made to examples of techniques which may be performed by or using a system for template-driven documentation generation. FIG. 7 is a flowchart of an example of a technique 700 for traversing a nested data structure. The technique 700 can be executed using computing devices, such as the systems, hardware, and software described with respect to FIGS. 1-6G. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof. The technique 700 can be implemented by a structure traversing tool, such as the structure traversing tool 504 of FIG. 5.

At 702, a data type is identified. The technique 700 may receive a data structure (e.g., class) definition, a class name, a parameter name, or any other descriptor or identifier that can be used to identify the data type so that the technique 700 can obtain the structure (e.g., the data elements) of the data type.

The steps shown in FIG. 7 assume that the received data type is a non-basic data type. If the data type were a basic data type, then the technique 700 generates an output related to the data type, as described with respect to 710, and ends, at 716.

At 704, the data elements (e.g., members) of the data type are identified. To illustrate, if the data type RecordingLinkDTO is identified, then the technique 700 identifies the data members shown in the class definition 630 of FIG. 6C. In example, the technique 700 may identify the data members by leveraging the introspection features of an IDE, such as the IDE 408 of FIG. 4, to identify all the data elements associated with the data type. Introspection in an IDE is the process of examining the metadata of a class or type at runtime. Reflection APIs provided by the programming language, such as Java Reflection API, can be used to discover and enumerate the properties, data members (e.g., fields), and methods of a class.

The technique 700 then performs steps 708 through 712 for each of the data elements. At such, at 706, the technique 700 determines whether there are more data elements to process. If more data elements are present, the next data element is retrieved (e.g., considered or processed) at 708. Retrieving the data elements can include obtaining a definition (e.g., a data type) associated with the data element. When there are no further data elements, the technique 700 ends at 716.

At 710, an output related to the data element is output. For example, with respect to the data element recordingCloudLink of class definition 630 of FIG. 6C, the output can be the string "recordingCloudLink": "", as shown in the output 642. On the other hand, with respect to the data element recordingLocalItemDTOs, recognizing it is a list of non-basis data types, the output can be the string ""recordingLocalItemDTOs ": [" in addition for preparing an indentation level for the nested structure.

At 712, the technique 700 evaluates whether the current data element is a basic data type, which does not require further breakdown. If the data element is a non-basic data type, implying that it is a complex or a custom data structure, the technique 700 recursively analyzes this structure. Recursively analyzing the data structure can mean that the technique 700 invokes itself based on the data element. This recursive nature is depicted through the feedback loop from 712 back to 702.

As can be appreciated from the foregoing, that the technique 700 ends at 716 means that a current invocation of the technique 700 ends. If the current invocation is initiated (e.g., triggered) by another invocation of the technique 700, then that other invocation of the technique 700 resumes at 706. That is, control returns to the point in the technique 700 just after the current instance is called (i.e., at 714). At 714, the technique 700 may perform any necessary output completion regarding the data element. To illustrate, if the data element is a list, then the technique 700 may output a list closing string, such as the character "[," as shown in FIG. 6D.

Figure 8:
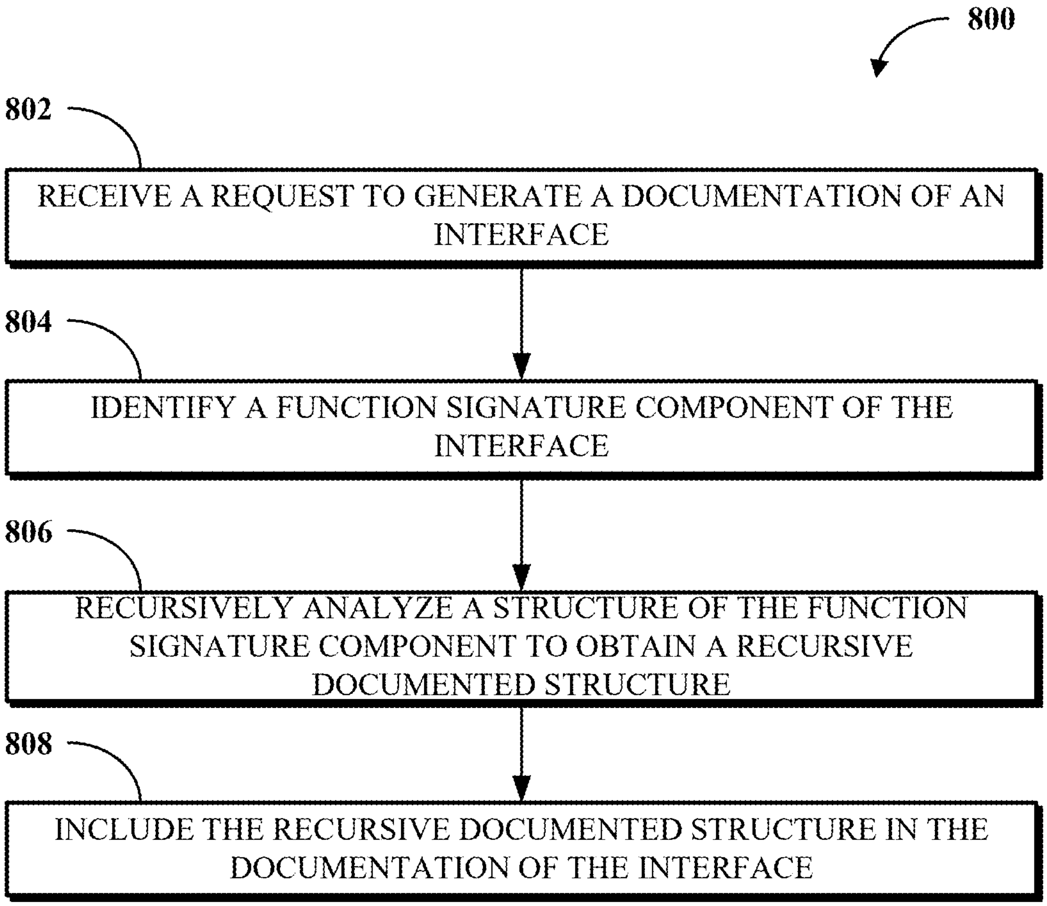
FIG. 8 is a flowchart of an example of a technique for template-based documentation generation.

FIG. 8 is a flowchart of an example of a technique 800 for template-based documentation generation. The technique 800 can be executed using computing devices, such as the systems, hardware, and software described with respect to FIGS. 1-7. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof. The technique 800 can be implemented by a documenter tool, such as the documenter tool 500 of FIG. 5.

At 802, a request to generate a documentation of an interface is received. The request can be received, such as from a developer, by a plugin (e.g., the documenter tool 500 of FIG. 5) to an IDE. At 804, a function signature component of the interface is identified. In an example, each function signature component can be identified. As such, the function signature component can be or correspond to an input parameter and/or a data type of the output (e.g., return) type of the interface.

At 806, the structure of the function signature component is recursively analyzed to obtain a recursive documented structure. In an example, reflection APIs of a programming language can be used to analyze the structure. In an example, to analyze the structure, a data type associated with the function signature component is identified; a determination is made as to whether the data type is a non-basic data type; and, in response to determining that the data type is the non-basic data type, the structure of the function signature component is recursively analyzed.

At 808, the recursive documented structure is included in the documentation of the interface. The documentation can be generated based on a template that includes placeholders. The structure of the function signature component may be recursively analyzed based on a placeholder identified in the template. The placeholder indicates that the structure is to be recursively analyzed. As such, the placeholder can be said to correspond to the recursive documented structure.

In an example, a discrepancy between the recursive documented structure and a source code associated with the function signature component can be identified. In response to identifying the discrepancy, an indication of the discrepancy can be output in association with the interface in the IDE. In an example, the documentation can be stored in a documentation repository. As such, discrepancies between documentation in the documentation repository and the source code from which the documentation is generated may be identified.

For simplicity of explanation, the techniques 700 and 800 of FIGS. 7 and 8, respectively, are each depicted and described herein as a respective series of steps or operations. However, the steps or operations of the techniques 700 and 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The disclosure presented herein may be considered in view of the following recitations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method includes receiving a request to generate a documentation of an interface; identifying a function signature component of the interface; recursively analyzing a structure of the function signature component to obtain a recursive documented structure; and including the recursive documented structure in the documentation of the interface. Other embodiments of this aspect include corresponding computer systems, apparatus, and computer programs recorded on one or more computer storage devices, each configured to perform the actions of the methods.

Implementations may include one or more of the following features. The method where the function signature component is an input parameter or an output type of the interface. Recursively analyzing the structure of the function signature component may include: identifying a data type associated with the function signature component; determining whether the data type is a non-basic data type; and in response to determining that the data type is the non-basic data type, recursively analyzing the structure of the function signature component. The structure of the function signature component can be recursively analyzed using reflection application programming interfaces of a programming language. The method may include identifying a template; and generating the documentation based on the template. The method may include storing the documentation in a documentation repository. The method may include identifying a discrepancy between the recursive documented structure and a source code associated with the function signature component; and in response to identifying the discrepancy, outputting an indication of the discrepancy in association with the interface in an integrated development environment. Implementations of the described techniques may include hardware, a method or process, or computer software on a computer-accessible medium.

One general aspect includes a device that includes a memory and a processor. The processor can be configured to execute instructions stored in the memory to receive a request to generate a documentation of an interface, identify a function signature component of the interface, recursively analyze a structure of the function signature component to obtain a recursive documented structure, and include the recursive documented structure in the documentation of the interface. Other embodiments of this aspect include corresponding computer systems, apparatus, and computer programs recorded on one or more computer storage devices, each configured to perform the actions of the methods.

Implementations may include one or more of the following features. The device where the function signature component can be an input parameter of the interface. The function signature component can be recursively analyzed based on a determination that the function signature component is a non-basic data type. The processor can be further configured to execute instructions stored in the memory to generate the recursive documented structure based on a documentation template that includes a placeholder corresponding to the recursive documented structure. The documentation of the interface can be stored a documentation repository. The processor can be further configured to execute instructions stored in the memory to identify a discrepancy between the documentation and a source code associated with the interface. The request can be received in an integrated development environment. Implementations of the described techniques may include hardware, a method or process, or computer software on a computer-accessible medium.

One general aspect includes a non-transitory computer readable medium storing instructions operable to cause one or more processors to perform operations. The operations can include receiving a request to generate a documentation of an interface; identifying a function signature component of the interface; recursively analyzing a structure of the function signature component to obtain a recursive documented structure; and including the recursive documented structure in the documentation of the interface. Other embodiments of this aspect include corresponding computer systems, apparatus, and computer programs recorded on one or more computer storage devices, each configured to perform the actions of the methods.

Implementations may include one or more of the following features. The non-transitory computer readable medium where the function signature component may correspond to an output of the interface. Recursively analyzing the structure of the function signature component may include recursively analyzing the structure of a data member of the structure that is a non-basis data type. The request can be received by a plugin to an integrated development environment. Operations may include generating the documentation based on a template. The operations may include identifying discrepancies between documentation in a documentation repository and source code from which the documentation is generated. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving a request to generate a documentation of an interface;

identifying a function signature component of the interface;

recursively analyzing a structure of the function signature component using reflection application programming interfaces of a programming language to obtain a recursive documented structure, wherein recursively analyzing the structure of the function signature component comprises:

identifying a data type associated with the function signature component;

determining whether the data type is a non-basic data type; and in response to determining that the data type is the non-basic data type, recursively analyzing the structure of the function signature component using the reflection application programming interfaces; and including the recursive documented structure in the documentation of the interface.

2. The method of claim 1, wherein the function signature component is an input parameter or an output type of the interface.

3. The method of claim 1, further comprising:

identifying a template; and generating the documentation based on the template.

4. The method of claim 1, further comprising:

storing the documentation in a documentation repository.

5. The method of claim 1, further comprising:

identifying a discrepancy between the recursive documented structure and a source code associated with the function signature component; and in response to identifying the discrepancy, outputting an indication of the discrepancy in association with the interface in an integrated development environment.

6. The method of claim 1, wherein the recursive documented structure comprises a structured representation of data members of the non-basic data type, the structured representation including, for each data member: a name of the data member and a data type of the data member, and for each data member that is a non-basic data type, a further structured representation of data members thereof.

7. The method of claim 1, wherein the non-basic data type comprises a composite data structure having one or more data members, and wherein a basic data type comprises primitive data types of the programming language and wrapper classes designated as non-traversable.

8. A device, comprising:

a memory; and a processor, the processor configured to execute instructions stored in the memory to:

receive a request to generate a documentation of an interface;

identify a function signature component of the interface;

recursively analyze a structure of the function signature component using reflection application programming interfaces of a programming language to obtain a recursive documented structure, wherein to recursively analyze the structure of the function signature component comprises to:

identify a data type associated with the function signature component;

determine whether the data type is a non-basic data type; and in response to determining that the data type is the non-basic data type, recursively analyze the structure of the function signature component using the reflection application programming interfaces; and including the recursive documented structure in the documentation of the interface.

9. The device of claim 8, wherein the function signature component is an input parameter of the interface.

10. The device of claim 8, wherein the processor is further configured to execute instructions stored in the memory to:

generate the recursive documented structure based on a documentation template that includes a placeholder corresponding to the recursive documented structure.

11. The device of claim 8, wherein the documentation of the interface is stored a documentation repository.

12. The device of claim 8, wherein the processor is further configured to execute instructions stored in the memory to:

identify a discrepancy between the documentation and a source code associated with the interface.

13. The device of claim 8, wherein the request is received in an integrated development environment.

14. The device of claim 8, wherein the processor is further configured to execute instructions stored in the memory to:

parse a documentation template to identify a placeholder indicating that a structure associated with a function signature component is to be recursively analyzed; and interpolate the recursive documented structure into the placeholder.

15. A non-transitory computer readable medium storing instructions operable to cause one or more processors to perform operations comprising:

receiving a request to generate a documentation of an interface;

identifying a function signature component of the interface;

recursively analyzing a structure of the function signature component using reflection application programming interfaces of a programming language to obtain a recursive documented structure, wherein recursively analyzing the structure of the function signature component comprises:

identifying a data type associated with the function signature component;

determining whether the data type is a non-basic data type; and in response to determining that the data type is the non-basic data type, recursively analyzing the structure of the function signature component using the reflection application programming interfaces; and including the recursive documented structure in the documentation of the interface.

16. The non-transitory computer readable medium of claim 15, wherein the function signature component corresponds to an output of the interface.

17. The non-transitory computer readable medium of claim 15, wherein the request is received by a plugin to an integrated development environment.

18. The non-transitory computer readable medium of claim 15, further comprising:

generating the documentation based on a template.

19. The non-transitory computer readable medium of claim 15, further comprising:

identifying discrepancies between documentation in a documentation repository and source code from which the documentation is generated.

20. The non-transitory computer readable medium of claim 15, wherein the structure of the function signature component is dynamically identified from source code by parsing definitions of data structures, interfaces, and complex types to construct a representation of relationships and dependencies thereof.

* * * * *